L. C. BAYLES.
COMBINED THROTTLE VALVE AND OILER.
APPLICATION FILED DEC. 27, 1909.
982,927.
Patented Jan. 31, 1911.
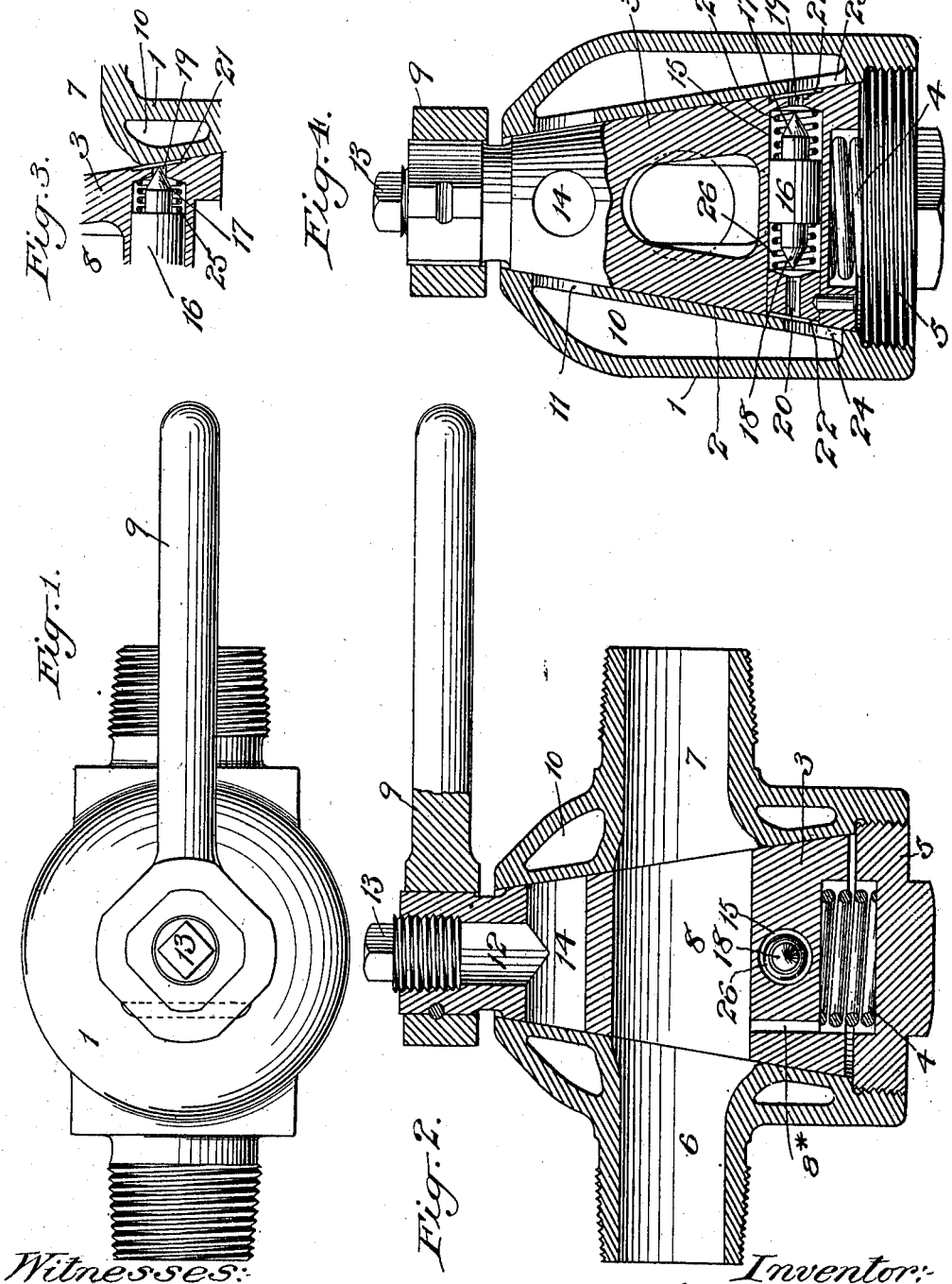

UNITED STATES PATENT OFFICE.

LEWIS C. BAYLES, OF JOHANNESBURG, TRANSVAAL, ASSIGNOR TO INGERSOLL-RAND COMPANY, OF NEW YORK, N. Y., A CORPORATION OF NEW JERSEY.

COMBINED THROTTLE-VALVE AND OILER.

982,927.  Specification of Letters Patent.  Patented Jan. 31, 1911.

Application filed December 27, 1909. Serial No. 534,990.

*To all whom it may concern:*

Be it known that I, LEWIS C. BAYLES, a citizen of the United States, and resident of Johannesburg, Transvaal, have invented new and useful Improvements in Combined Throttle-Valves and Oilers, of which the following is a specification.

My invention relates to improvements in combined throttle valves and oilers and has for its object to provide a novel device for feeding small quantities of oil from the reservoir to the fluid passing through the valve.

A practical embodiment of my invention is represented in the accompanying drawings, in which—

Figure 1 represents in top plan a combined throttle valve and oiler with my invention applied thereto, Fig. 2 is a longitudinal central section through the same, the valve plug being turned to its open position, Fig. 3 is a detail longitudinal vertical section with the valve plug turned to its closed position, and Fig. 4 is a transverse central section through the combined throttle valve and oiler.

The valve casing is denoted by 1 and its tapered valve plug seat by 2. The tapered valve plug 3 is frictionally held in its seat by suitable means, such, for instance, as by a spring 4 interposed between the larger end of the valve plug and the removable cap 5. The inlet and outlet ports 6 and 7 in the casing are in alinement and the through port 8 in the valve plug is arranged to open and close communication between the said ports 6 and 7. A passage 8* leads from the through port 8 to the space in which the spring 4 is located for causing the pressure fluid to exert an additional pressure on the valve plug to hold it tightly in its seat when the plug is in its open position. The valve plug is provided at its smaller end with a handle 9.

The outer wall of the casing 1 is spaced from the inner wall which forms the valve seat to provide an oil reservoir 10 surrounding the valve seat. The oil reservoir 10 is supplied with oil in any suitable manner, as, for instance, through the valve plug, as follows:—One or more oil supply ports 11 lead from the face of the valve plug 3 to the reservoir at one side of the inlet and outlet ports 6 and 7 in the casing. A filling passage is provided in the valve plug, the axial branch 12 of which leads through the smaller end of the valve plug and is provided with a removable stopper 13; and the one or more lateral branches 14 of which leads or lead to the face of the valve plug into position to be opened to the one or more oil supply ports 11 when the valve plug is turned to close the valve and to be closed to said one or more ports 11 when the valve plug is turned to open the valve.

The novel device which I have provided for feeding oil in small quantities from the reservoir to the pressure fluid which passes through the valve, is constructed, arranged and operated as follows:—A cross chamber 15 is provided in the larger end of the valve plug within which chamber a plunger 16 is fitted to reciprocate. This plunger 16 is provided with oppositely arranged tapered ends 17, 18, arranged to close holes 19, 20, leading from the chamber 15 to shallow recesses 21, 22, in the face of the valve plug. These recesses 21, 22, are opened to oil discharge ports 23, 24, from the reservoir 10 when the valve is opened and are brought into communication with the inlet and outlet ports 6 and 7 when the valve is closed. Coil springs 25, 26, are interposed between the ends of the cross chamber 15 and the plunger 16 for normally holding the plunger at a point intermediate the limits of its movement thereby opening the chamber 15 to the face of the valve through both of the holes 19, 20. When the valve plug is turned to open communication between the inlet and outlet ports 6 and 7, of the valve, the chamber 15 will be brought into open communication with the oil reservoir 10 and the chamber upon both sides of the plunger 16 will be filled with oil. When the valve plug is turned in either direction to close communication between the inlet and outlet ports 6 and 7 of the valve, the space in the chamber 15 upon one side of the plunger 16 will be opened to the inlet port 6 and the space upon the other side of the plunger 16 will be open to the outlet port 7. The pressure of the fluid from the inlet port 6 will act upon the plunger 16 moving it to the limit of its movement in one direction against the tension of one of the springs 25, 26, thus first causing the plunger to eject a certain proportion of the oil into the outlet port 7 and then close the hole 19 or 20 according to the direction in which the valve plug has been turned. As the valve plug is again turned to open communication between the inlet and outlet ports 6 and 7, the oil which has been forced by the plunger into the outlet port 7 will be carried along with the pressure fluid to the machine or tool in connection with which the system is being used.

To fill the reservoir, the valve plug is turned to bring its filling passage into communication with the filling port or ports of the reservoir. The stopper 13 is then removed, the oil poured in, and the stopper replaced.

It will thus be seen that means are employed for intermittently feeding a small quantity of oil to the pressure fluid pipe line each time the valve is closed.

What I claim is:—

1. In a combined throttle valve and oiler for pressure fluid supply systems, an oil reservoir, a chamber arranged to be open to the reservoir when the valve is in one position and to the pressure fluid supply passage when the valve is in another position, a plunger in said chamber operated by fluid pressure for ejecting a predetermined amount of oil into the said pressure fluid supply passage, and means for normally holding the plunger intermediate the limits of its movements.

2. In a combined throttle valve and oiler for pressure fluid supply systems, an oil reservoir, a chamber arranged to be open to the reservoir when the valve is open and to be open to the pressure fluid supply passage when the valve is closed and a plunger in said chamber operated by fluid pressure when the valve is closed to cause it to eject a predetermined amount of oil into the said pressure fluid supply passage.

3. In a combined throttle valve and oiler for pressure fluid supply systems, an oil reservoir, a chamber arranged to be open to the reservoir when the valve is open and to be open to the pressure fluid supply passage when the valve is closed, and a plunger in said chamber operated by fluid pressure when the valve is closed to cause it to eject a predetermined amount of oil into the said pressure fluid supply passage, and means for normally holding the plunger intermediate the limits of its movements when the valve is open.

4. In a combined throttle valve and oiler for pressure fluid supply systems, a casing having inlet and outlet ports, an oil reservoir in the casing, a valve plug arranged to open and close communication between the inlet and outlet ports, a chamber in the valve plug arranged to be open to the oil reservoir or to the inlet and outlet ports according to the position of the valve plug, a plunger in said chamber operated by fluid pressure when the chamber is in communication with the inlet and outlet ports, for ejecting a predetermined amount of oil into the outlet port, and means for normally holding the plunger intermediate the limits of its movements when the chamber is in communication with the oil reservoir.

In testimony, that I claim the foregoing as my invention, I have signed my name in presence of two witnesses, this twenty second day of December 1909.

LEWIS C. BAYLES.

Witnesses:
F. GEORGE BARRY,
HENRY THIEME.